United States Patent [19]

Axelsson et al.

[11] Patent Number: 4,834,791

[45] Date of Patent: May 30, 1989

[54] METHOD FOR PRODUCING RAW IRON FROM IRON CONCENTRATES FOR THE MANUFACTURE OF GAS, AND PLANT APPARATUS FOR CARRYING OUT THE METHOD

[75] Inventors: Carl L. Axelsson, Enskede; Mikael Brunner, Täby; Dan Kaufmann, Oxelösund; Krister Torsell, Söderbärke, all of Sweden

[73] Assignee: IPS Interproject Service AB, Sweden

[21] Appl. No.: 44,368

[22] PCT Filed: Jul. 11, 1986

[86] PCT No.: PCT/SE86/00333

§ 371 Date: Mar. 23, 1987

§ 102(e) Date: Mar. 23, 1987

[87] PCT Pub. No.: WO87/00554

PCT Pub. Date: Jan. 29, 1987

[30] Foreign Application Priority Data

Jul. 23, 1985 [SE] Sweden ............................. 8503571

[51] Int. Cl.$^4$ .................................................. C21B 13/14
[52] U.S. Cl. ................................................ 75/26; 75/29; 266/142
[58] Field of Search ................ 75/40, 26, 29, 38; 266/142, 143

[56] References Cited

U.S. PATENT DOCUMENTS 4,566,904  1/1986  von Bogdandy et al. ............... 75/40
4,591,381  5/1986  Axelsson et al. ........................ 75/40

Primary Examiner—S. Kastler
Attorney, Agent, or Firm—Silverman, Cass, Singer & Winburn, Ltd.

[57] ABSTRACT

A method for producing raw iron from iron-bearing oxidic material, comprising finally reducing the iron oxide by charging the iron oxide, coal, oxygen gas and slag-forming flux to a molten iron bath contained in at least one reactor vessel, a final reduction reactor (2) for final reduction of the iron oxide, and pre-reducing primarily non-reduced iron oxide in a pre-reduction stage (1), and subsequently charging the pre-reduced iron oxide to the reactor, and generating reduction gas (17) for the aforesaid pre-reduction process. The method is particularly characterized in that reduction gas for the pre-reduction process (1) is generated by a separate gas generating process (3) effected in at least one reactor (3), a gas generating reactor, separate from the final reduction reactor or reactors (2). The invention also relates to a plant for carrying out the method.

17 Claims, 1 Drawing Sheet

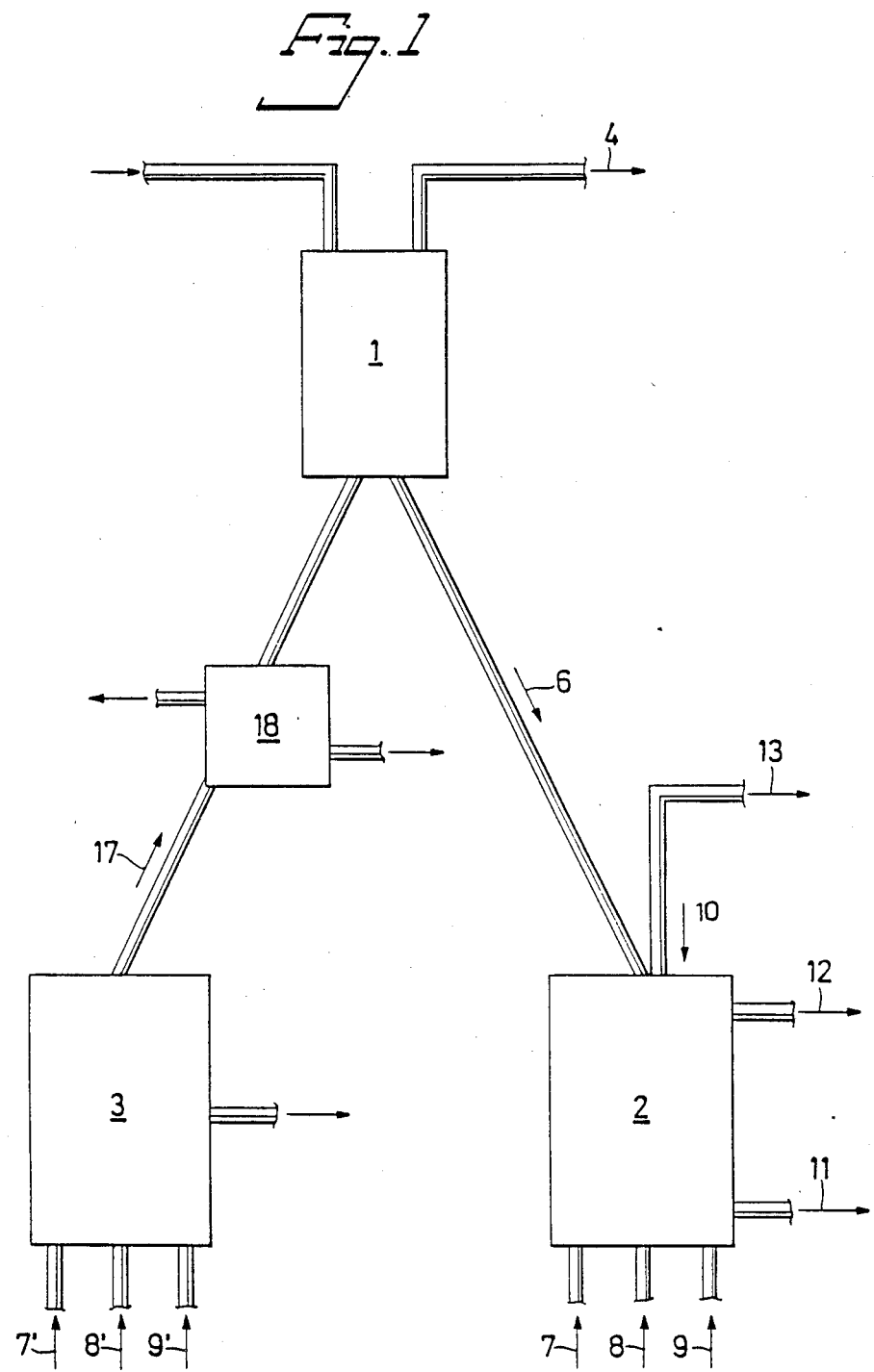

METHOD FOR PRODUCING RAW IRON FROM IRON CONCENTRATES FOR THE MANUFACTURE OF GAS, AND PLANT APPARATUS FOR CARRYING OUT THE METHOD

The present invention relates to a method for producing raw iron from iron concentrates and for the manufacture of gas.

The invention also relates to plant apparatus for carrying out the method.

A reactor for producing gas and also a certain amount of raw iron in conjunction therewith is known from Swedish Patent Specification No. 7706876-5. In this Swedish patent specification there is described a method for producing a gaseous mixture of primarily carbon monoxide (CO) and hydrogen gas ($H_2$) from coal which contains a certain amount of water. When practising this known method, coal is injected into a molten metal bath in quantities which are stoichiometrically excessive in relation to the oxygen injected into the bath in the form or iron oxides, at the same time as gaseous oxygen is injected so as to oxidize the coal excess. Thus, although the method relates to the manufacture of gas a significant quantity of iron is also produced.

The Swedish Patent Specification No. 8103201-3 also describes a method for the gasification of coal, in which a reactor is used. According to this patent specification coal, oxygen gas and iron oxides are also charged to the reactor vessel, the iron oxides constituting a cooling medium. Coal is introduced into the molten bath in stoichiometric quantities in relation to the oxygen gas injected thereinto. The invention according to this patent resides in placing the reactor under an overpressure, thereby enabling a far greater quantity of gas to be produced, since a greater amount of coal an oxygen gas in relation to the size of the bath can be introduced thereinto than when atmospheric pressure prevails. According to this patent specification, the prime object of the invention is to increase the production of gas.

Thus, th aforementioned patent specification relate to gas manufacturing processes, where the object is to produce as much gas as possible. The fact that iron-bearing materials are also injected into the bath is simply because it is desired to convert the molten iron bath in a manner to prevent it becoming excessively contaminated with impurities introduced in the coal.

The Swedish Patent Specicication No. 8301159-3 describes a method for the manufacture of raw iron, in which the energy content of the coal is utilized to the maximum. When the coal is used to a maximum it means, in principle, that solely carbon dioxide ($CO_2$) and steam ($H_2O$) leave the process, while charging as little coal as possible to the process. The patent specification discribes herewith a method for producing raw iron from iron concentrates, in which iron concentrate, coal, oxygen gas, and slag-forming flux are injected into a reactor beneath the surface of a molten iron bath present therein, and in which the ratio of $CO_2$ to CO present in the gas is caused to increase to a value greater than that which corresponds to the state of equilibrium at aatmospheric pressure, thereby causing more heat to be generated in the bath for a given amount of coal, and in which method the amount of coal charged to the system in relation to the amount of concentrate present is predetermined to a sufficiency for finally reducing in the reactor pre-reduced iron concentrate, and in which CO and $H_2$ in the waste gases are passed to a pre-reduction stage in which non-reduced iron concentrate is pre-reduced, whereafter, this concentrate is charged to the reactor. Iron concentrates are partially reduced in a pre-reduction stage to a degree considered optimal for final reduction in a reactor.

When applying the iron manufacturing technique disclosed in the Swedish Patent Specification No. 8301159-3 it is necessary to create a balance between the reactor conditions so that raw iron and gas can be produced. The conditions, such as temperature and starting materials, however, are not the optimal conditions, either with respect to the manufacture of iron or to the production of gas, but are the result of a compromise. Thus, serious problems are created with respect to heat balance and the use of reduction gas for the aforesaid pre-reduction process, due to the fact that the redcuction gas is generated in the iron manufacturing reactor. Consequently, it is necessary to undertake an energy-consuming gas cleansing process in order to obtain a $CO/H_2$ -content suitable for the prereduction process while simultaneously removing $CO_2$ and $H_2O$ from the reduction gas.

The present invention is based on an understanding of the problems with which the technique according to Swedish Patent Specification 8301159-3is encumbered, and in the knowledge that raw iron can be produced by following a completely different procedure within the framework of the basic manufacturing process. The method, which permits raw iron to be manufactured under conditions of greater optimum, enables an adaptation to be made, with a particularly high degree of flexibility, to prevailing secondary conditions, both with respect to process technique and products.

The invention thus relates to a method for manufacturing raw iron from iron-bearing oxidic material, in which the iron oxide is finally reduced by charging the iron oxide, coal, oxygen gas and a slag-forming flux to a molten metal bath of at least one reactor vessel (a final reduction reactor) for final reduction of the iron oxide, in which primarily non-reduced iron oxide is pre-reduced in a pre-reduction stage and thereafter charged to the reactor, and a reduction gas is generated for said pre-reduction process.

The method is particularly characterized in that the gas intended for the pre-reduction stage is generated by a separate gas generating process carried out in at least one separate reactor, a gas generating reactor, separate from the final reduction reactor or reactors.

The invention also relates to plant apparatus for production raw iron-bearing oxidic materials, comprising at least one reactor vessel, a final reduction reactor, in which the iron oxide is intended to be finally reduced by supplying iron oxide, coal, oxygen gas and slag-forming flux to the surface of a molten iron bath present in the reactor, there being provided a pre-reduction stage in which primarily non-reduced iron oxide is intended to be pre-reduced, this iron oxide subsequent to said pre-reduction process being intended to be finally reduced in the final reduction reactor, said plant apparatus also comprising means for generating reduction gas for carrying out said pre-reduction process.

The plant is characterized by at least one separate reactor, a gas generating reactor for the separate generation of reduction gas for the pre-reduction process, this reactor being separate from the final reduction reactor or reactors, the pre-reducing gas being generated in a manner substantially known per se, by charging primarily coal and oxygen gas to the surface of a molten metal bath, preferably a molten iron bath present in the reactor or reactors.

The invention will now be described in more detail with reference to an exemplifying embodiment thereof and to the accompanying drawing, the sigle FIGURE of which is a block schematic illustrating a process according to the invention.

In FIG. 1 there is shown a pre-reduction stage 1, a final reduction stage 2 and a gas production stage 3.

The pre-reduction stage 1 may comprise a two-stage or three-stage fluidized bed to which iron concentrate is supplied continuously in the form of iron concentrate or micropellets pre-heated to a temperature of, for example, 250° C. in a pre-heating unit (not shown). Coal or coke can also be admixed with the charged material when desired. A given part of the gas exiting from the pre-reduction stage, this gas being indicated by arrow 4 in FIG. 1 and containing CO, $CO_2$, $H_2$ and $H_2O$, can be passed through a dust separator, e.g. cyclones, and then returned to the pre-heating unit.

As illustrated by the arrow 6, the pre-reduced iron concentrate is passed to the final reduction stage 2, optionally via an intermediate storage facility.

The final reduction stage incorporates at least one ceramiclined reactor containing a carbonaceous iron bath, suitably having a carbon content in excess of 1% and a temperature of 1300°–1600° C. Pre-reduced iron concentrate 6, coal 7, oxygen gas ($O_2$) 8 and a slag-forming flux (e.g. CaO) 9 are charged to the reactor. These materials are preferably charged to the reactor through injection nozzles located in the lower part of the reactor. The prereduced iron concentrate, however, can alternatively be charged through injection nozzles located above the surface of the molten bath or in the so-called slag line. The raw iron 11 and slag 12 formed in the final reduction stage 2 can be tapped-off continuously or intermittently in a known manner.

The gas production stage 3 includes at least one ceramiclined reactor. The reactor is charged primarily with coal 7', oxygen gas 8' and coolant 9'. Gasification can there-with be carried out in a conventional manner. The gas can also be produced substantially in accordance with Swedish Patent Specifications Nos. 7706876-5 and 81032013. In this case, the gas production stage 3 incorporates at least one ceramic-lined reactor which contains a carbonaceous iron bath suitably having a carbon content in excess of 1% and a temperature of 1300°–1600° C. Oxygen in the form of iron oxides and oxygen gas is introduced into the molten bath in a stoichiometric relationship with the coal. The main purpose in this case is to obtain a reduction gas, a mixture of CO and $H_2$. It is not necessary to remove carbon dioxide from the gas, and the gas can be charged to the pre-reduction stage 1 for use in the pre-reduction process, optionally subsequent to passing through a gas cleansing stage 18 to remove dust therefrom, as illustrated by the arrow 17 in FIG. 1.

The fundamental principle of the method according to the invention will be understood to a substantial degree from the aforegoing. However, since the gas production stage and the final reduction stage constitute process stages as substantial flexibility with regard, inter alia, to production capacity, the production of raw iron and gas, a large number of variants adapted to different secondary conditons are conceivable.

Conceivably, it is preferable in the majority of cases to impart a high degree of oxidation to the waste gases 13 from the final reduction stage 2, for example a degree of oxidation greater than 5% but lower than 100%, preferably 10–90%, thereby to effect so-called afterburning of the gas generated. The degree of oxidation is defined as $$O.D. (\%) = \frac{CO_2 + H_2O}{CO + H_2 + CO_2 + H_2O} \times 100$$

Thus, with 0 oxidation the gas comprises CO and $H_2$, and at O.D=100% of $CO_2$ and $H_2O$.

The combustion of CO and $H_2$ to $CO_2$ and $H_2O$ takes place in the afterburning process. Thus, in maintaining a high degree of oxidation there is utilized the energy content of the reduction gas generated in the final reduction stage 2. The energy content of the waste gases can be utilized to a maximum, by combusting the waste gases from the final reduction reactor in the upper part of the reactor above the surface of the molten bath with the aid of suitable oxidation techniques, in a manner such that the bath absorbs heat from the superheated gas.

Correspondingly, it may be preferred in the majority of cases to induce in the gas generating stage 3 a degree of oxidation which is so low, such as beneath 10%, as to avoid the necessity of cleansing the generated reduction gas 17 of its carbon dioxide content.

For the purpose of optimizing the process, the composition of the coal and/or the oxygen content of the oxygen gas used and/or the temperature applied may be mutually different for the final reduction stage and the separate gas generating stage. Thus, in the final reduction stage the sulphur content of the coal composition is suitably much lower than the sulphur content of the coal composition used in the separate gas generating stage. This reduces the necessity of removing sulphur from the raw iron obtained in the final reduction stage to a low level, wherewith the tapping-off temperature in the final reduction stage can be held at lower level than in the case when comprehensive sulphur extraction processes need to be carried out in a separate sulphur cleansing stage. In the majority of cases a high sulphur content in the gas generating stage can be tolerated. Thus, it is possible, in this way, to optimize the sulphur load on the total process.

A conceivable variant of the method according to the invention is one in which the iron charge, for example in the form of concentrate and pre-reduced material, is divided between the final reduction stage and the separate gas generating stage in order to achieve maximum production of raw iron and reduction gas.

When transferring the reduction gas from the gas generating stage 3, a number of different possibilities are concivable. For example, the reduction gas when transferred to the pre-reduction stage may have a high or a low temperature, such as substantially room temperature, and may be cleansed of dust or not as the case may be.

The final reduction stage and/or the separate gas generating stage can be carried out at atmospheric pressure or pressure thereabove. At pressures above atmospheric one of the reactors 1 and 3 or both of the reactors are brought to a total pressure beneath 100 bars, preferably 1–10 bars.

According to the invention respective reactor vessels are preferably given a form and structural design adapted to the process to be carried out in the reactor. Thus, in suitable cases, a reactor for the final reduction stage is preferably constructed so as to be suitable for combusting gas above the surface of the molten bath and for utilizing the energy released during the gas combustion process. In this respect the reactor should not have a pronounced conical configuration at a location immediately above the bath surface. In this regard, the reactor walls may be cooled in certain reactor constructions. In suitable cases a reactor in which the separate gas generating process is effected may be contructed for a relatively deep bath.

As will be understood from the aforegoing, the invention affords considerable advantages in comparison with prior art techniques. Thus, (1) the gas production process and the raw iron production process are not dependent upon one another, (2) the reduction gas can be given a low carbon dioxide content without needing to employ energy-consuming and investment-requiring gas purification processes, (3) the coal requirement in the final reduction stage can be reduced, resulting in higher productivity and a decrease in load with regard to sulphur impurities, (4) the process becomes more accessible due to the separate production of gas and raw iron, (5) the form of respective can be optimized and the wear on the reactor linings reduced by utilizing optimum conditions, such as temperature and slag composition in respective process stages.

Although the invention has been described in the aforegoing with reference to a selected examplifying embodiment thereof it will be understood that other embodiments and minor modifications are conceivable within the scope of the invention concept.

For example, a number of variants are conceivable with regard to the structural design of the reactor or the final reduction process in order to protect the reactor walls against the stresses created primarily by the high temperatures prevailing in the afterburning process for achieving high degrees of oxidation.

Water cooling has been mentioned in the aforegoing. It is also possible, however, to change a material which will form a curtain which protects the walls. The slag can also be fermented to provide a shielding effect, by combusting gas centrally in the reactor above the surface of the bath. It is also conceivably possible to rotate the molten bath and slag so that the molten metal and bath creeps up along the reactor wall. A further possibility is one of rotating the actual reactor.

It will be evident from the aforegoing that a number of different variants are conceivable in which regard is paid to various secondary conditions. For example, gas from the separate gas generating stage can be used for purposes other than pre-reduction purposes. According to the invention the process can be advantageously driven continuously, since the gas generation stage is separate from the final reduction stage. Gas from the final reduction reactor 2 can also be passed to the gas generating reactor 3 for regeneration.

The invention is not restricted to the described and illustrated embodiment and modifications can be made within the scope of the following claims.

We claim:

1. A method for producing raw iron from iron-bearing oxidic material, comprising finally reducing the iron oxide by charging the iron oxidic material, coal, oxygen gas and a slag-forming flux to a molten iron bath having a bath surface present in at least one reactor vessel for final reduction of said iron oxidic material, and by pre-reducing in a pre-reduction stage primarily non-reduced iron oxide, and subsequently injecting the pre-reduced iron oxid into the reactor, and generating reduction gas for said pre-reduction process, wherein new reduction gas for the pre-reduction stage (1) is produced by separate gas generation (3) in at least one reactor (3), a gas generating reactor, separate from the final reduction reactor or reactors (2) into which reactor (3) no gas products from the pre-reduction process are directly introduced.

2. A method according to claim 1, wherein the separate gas generating stage is effected by charging primarily (7') and oxygen gas (8') to a molten metal bath present in the reactor or reactors (3).

3. A method according to claim 1 including bringing the oxidation degree (O.D.) of the waste gases obtained from the final reduction stage (2) to a level higher than 5% and lower than 100% afterburning of generated gas being effected above the bath surface in the final reduction reactor (2).

4. A method according to claim 1, wherein the degree of oxidation (O.D.) of the reduction gas obtained from the separate gas generating stage (3) is brought to a level lower than 10%.

5. A method according to claim 1, wherein the sulphur content of the coal composition (7) used in the final reduction state (2) is lower than the sulphur content of the coal composition (7') used in the separate gas generating stage (3).

6. A method according to claim 1, wherein the iron oxide material charge is divided between the final reduction stage (2) and the separate gas generating stage (3) for the purpose of achieving maximum production of raw iron (11) and reduction gas (17).

7. A plant for producing raw iron from iron-bearing oxidic material, comprising at least one reactor vessel, a final reduction reactor in which the iron oxide is finally reduced by supplying iron oxide, coal, oxygen gas and slag-forming flux to the surface of a molten iron bath present in the reactor, a pre-reduction stage being provided in which primarily non-reduced iron oxide is pre-reduced, the iron oxide subsequent to said pre-reduction process being intended for final reduction in the final reduction reactor, and in which means are provided for generating reduction gas for said pre-reduction process, wherein said means for the separate generation (3) of reduction gas (17) for the pre-reduction process (1) include at least one separate reactor (3), a gas generating reactor (3), separate from the final reduction reactor or reactors (2) into which reactor (3) no gas products from the pre-reduction process are directly introduced, the separate reactor being arranged for production of reaction gas by chaarging coal (7') and oxygen gas (8') to the surface of a molten metal bath present in the reactor or reactors (3).

8. A plant according to claim 7, wherein respective reactor vessels (2,3) have a form and a construction adapted to the process to be carried out in the respective reactor, each final reduction reactor (2) being constructed in a manner which renders it suitable for combustion of gas the surface of the molten bath and for utilizing the energy released during said combusition process.

9. A plant according to claim 7, wherein the wall of each final reduction reactor (2) above the surface of the molten bath is protected against excessively high temperatures prevailing during the combusiton of gas above the surface of the molten bath, by at least one of cooling or shielding said wall.

10. A method according to claim 1, including bringing the oxidation degree (O.D.) of the waste gases obtained from the final reduction stage (2) to a level in the range of 10–90%, afterburning of generated gas being effected above the bath surface in the final reduction reactor (2).

11. A method according to claim 1, wherein the coal composition (7,7') is different for the final reduction stage (2) than for the separate gas generating stage (3).

12. A method according to claim 1, wherein the oxygen content of the oxygen-gas used (8,8') is different for the final reduction stage (2) than for the separate gas generating stage (3).

13. A method according to claim 1, wherein the temperature is different for the final reduction stage (2) than for the separate gas generating stage (3).

14. A method according to claim 1, wherein the final reduction stage (2) is carried out at a pressuree lower than 100 bar.

15. A method according to claim 1, wherein the separate gas generating stage (3) is carried out at a pressure lower than 100 bar.

16. A method according to claim 1, wherein the final reduction stage (2) is carried out at a pressure in the range of 1 to 10 bar.

17. A method according to claim 1, wherein 1, wherein the separate gas generating stage (3) is carried out at a pressure in the range of 1 to 10 bar.

* * * * *

UNITED STATES PATENT AND TRADEMARK OFFICE
CERTIFICATE OF CORRECTION

PATENT NO. : 4,834,791

DATED : May 30, 1989

INVENTOR(S) : Carl L. Axelsson, Mikael Brunner, Dan Kaufmann and Krister Torsell It is certified that error appears in the above-identified patent and that said Letters Patent is hereby corrected as shown below:

Column 1, line 38 "an" should be --and--;

Column 1, line 43 "th" should be --the--;

Column 2, lines 51 and 52 "production" should be --producing--;

Column 3, line 47 "81032013" should be --8103201-3--;

Column 5, line 27 after "respective" insert --reactors--;

Column 6, line 5 "oxid" should be --oxide--;

Column 8, line 5 "pressuree" should be --pressure--.

Signed and Sealed this

Thirteenth Day of March, 1990

*Attest:*

JEFFREY M. SAMUELS

*Attesting Officer*   *Acting Commissioner of Patents and Trademarks*